United States Patent
Kayama

(10) Patent No.: US 9,118,790 B2
(45) Date of Patent: Aug. 25, 2015

(54) INFORMATION PROCESSING APPARATUS, SYSTEM, METHOD, AND STORAGE MEDIUM

(71) Applicant: CANON KABUSHIKI KAISHA, Tokyo (JP)

(72) Inventor: Hiroyuki Kayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/558,409

(22) Filed: Dec. 2, 2014

(65) Prior Publication Data

US 2015/0156361 A1 Jun. 4, 2015

(30) Foreign Application Priority Data

Dec. 3, 2013 (JP) ................. 2013-250010

(51) Int. Cl.
*H04N 1/60* (2006.01)
*H04N 1/00* (2006.01)
*G06K 1/00* (2006.01)

(52) U.S. Cl.
CPC ......... *H04N 1/00832* (2013.01); *H04N 1/6008* (2013.01); *H04N 1/6058* (2013.01); *H04N 2201/0094* (2013.01)

(58) Field of Classification Search
None
See application file for complete search history.

(56) References Cited

U.S. PATENT DOCUMENTS

2006/0212819 A1* 9/2006 Tobioka .................. 715/764
2015/0015917 A1* 1/2015 Hirohata et al. ........... 358/3.24

FOREIGN PATENT DOCUMENTS

JP 2000-112706 A 4/2000
JP 2002-091743 A 3/2002

* cited by examiner

*Primary Examiner* — Quang N Vo
(74) *Attorney, Agent, or Firm* — Canon USA Inc. IP Division

(57) ABSTRACT

With respect to a job input to a printer, a job information management unit in a computer obtains information about a ratio of a color area in each page of the input job from the printer before the information is overwritten and stores the obtained information together with job identification information in a job information storage unit. Further, if information which is not recorded by another computer is included in a color information list of the printer regarding a copy job or a FAX job, the job information management unit obtains the information about a ratio of a color area in each page of the copy job of the FAX job from the printer.

11 Claims, 11 Drawing Sheets

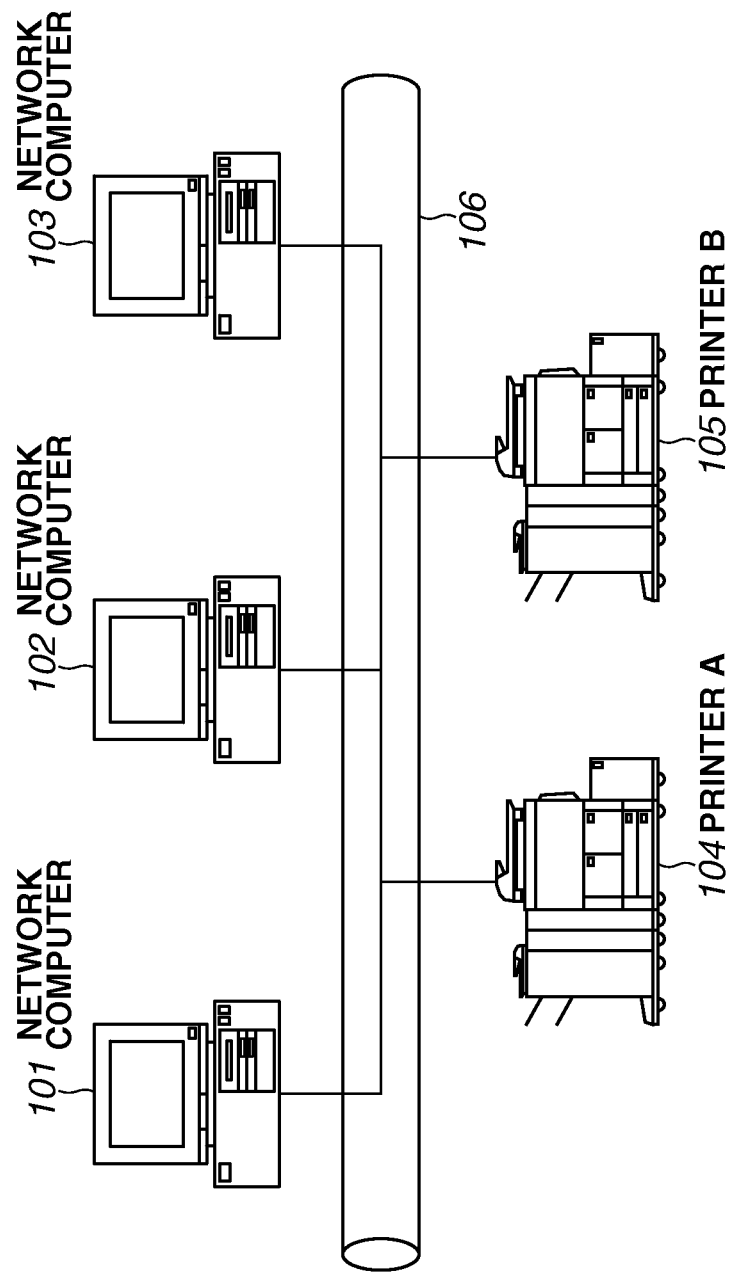

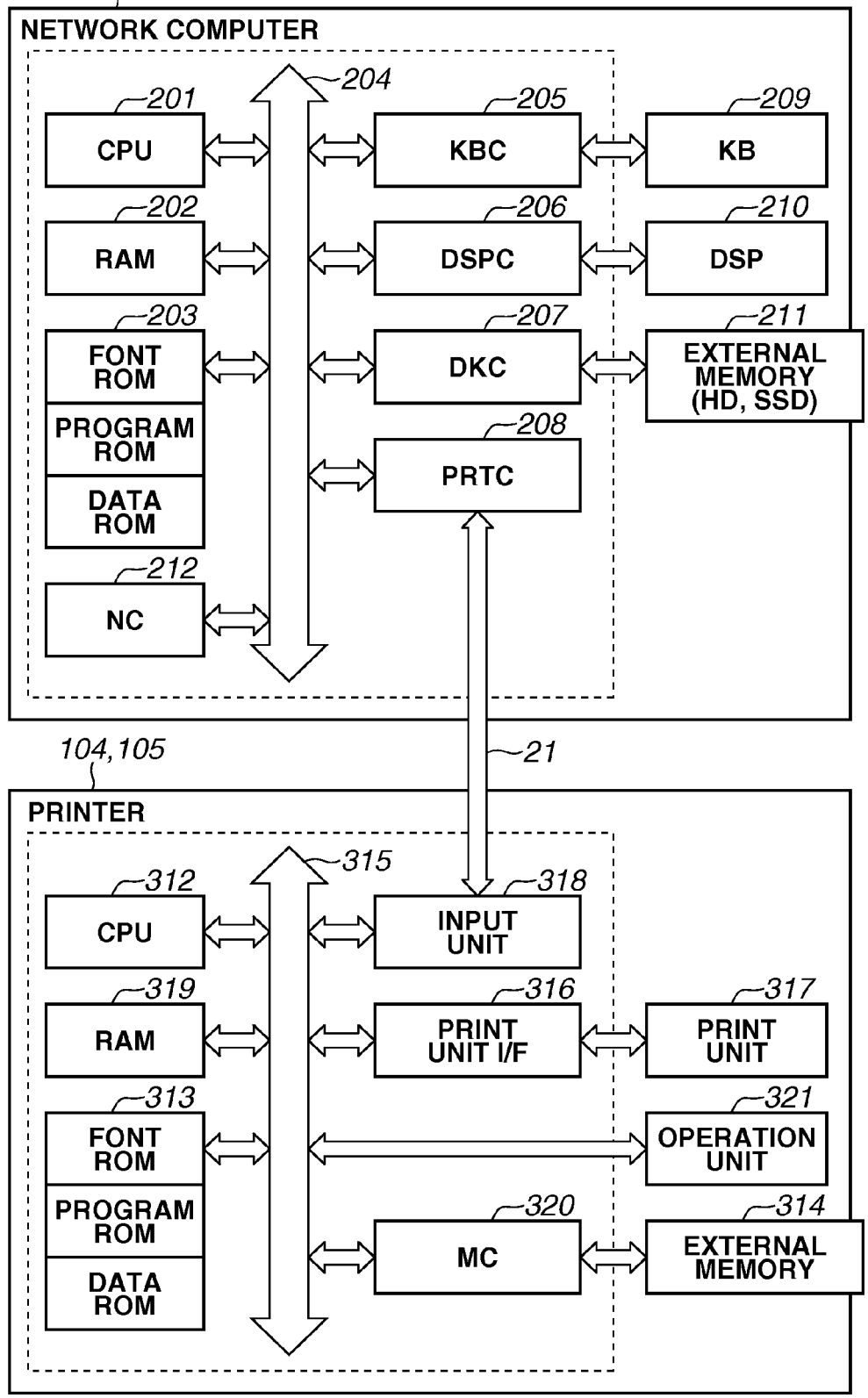

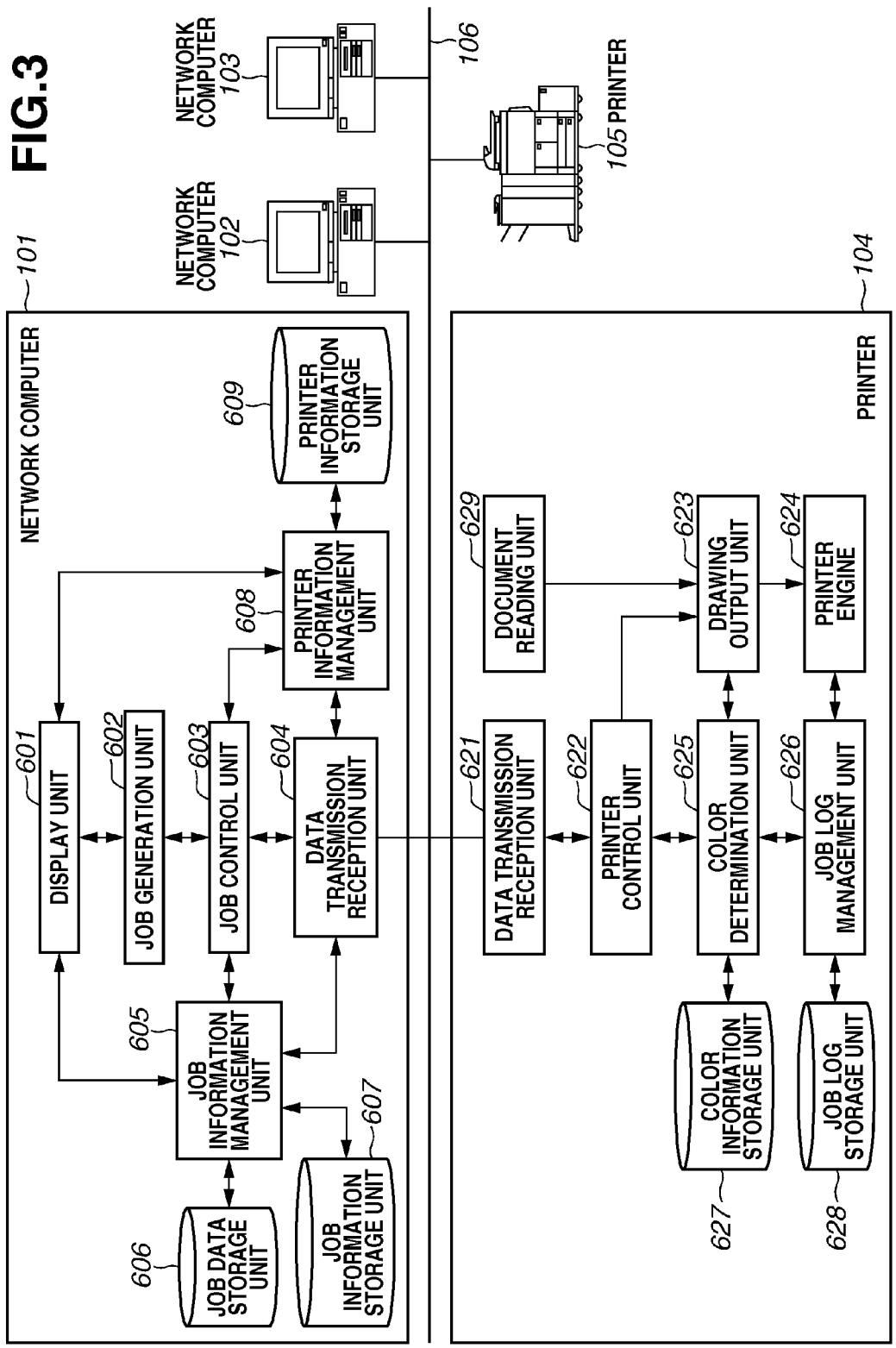

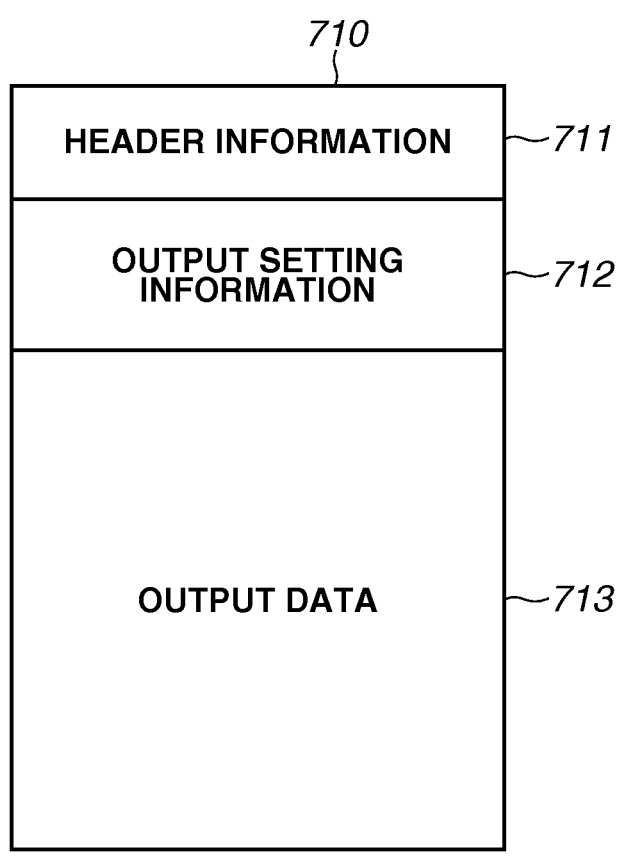

FIG.5A

| JOB ID | PRINTER | IN-APPARATUS JOB ID | JOB NAME | TYPE | STATUS | COLOR PAGE | FULL | MIDDLE | LOW | MONOCHROME PAGE | PAGE | COLOR RATIO |
|---|---|---|---|---|---|---|---|---|---|---|---|---|
| 001 | Printer A | 1001 | Job1 | Print | Printed | 40 | 10 | 25 | 5 | 10 | 1/50 | 15 |
|  |  |  |  |  |  |  |  |  |  |  | 2/50 | 80 |
|  |  |  |  |  |  |  |  |  |  |  | 3/50 | 5 |
|  |  |  |  |  |  |  |  |  |  |  | ... | ... |
|  |  |  |  |  |  |  |  |  |  |  | 50/50 | 72 |
| 101 | Printer A | 1005 | Job5 | Copy | Printed | 3 | 0 | 1 | 2 | 17 | 1/20 | 0 |
|  |  |  |  |  |  |  |  |  |  |  | 2/20 | 5 |
|  |  |  |  |  |  |  |  |  |  |  | ... | ... |
|  |  |  |  |  |  |  |  |  |  |  | 20/20 | 0 |

| PRINTER | IN-APPARATUS JOB ID | COMPUTER JOB ID | JOB NAME | TYPE | JOB ISSUER | STATUS | NUMBER OF PAGES | NUMBER OF OUTPUT PAGES |
|---|---|---|---|---|---|---|---|---|
| Printer A | 1006 | 006 | Job6 | Print | MyJob | PRINTING IN PROGRESS | 100 | 40 |
| Printer A | 1007 | — | Job7 | Copy | Other | PRINT WAITING | 120 | 0 |
| Printer A | 1008 | 208 | Job8 | Print | Other | PROCESSING IN PROGRESS | 45 | 0 |
| Printer A | 1009 | 009 | Job9 | Print | MyJob | PROCESSING WAITING | 20 | 0 |
| Printer B | 5001 | 501 | Job50 | Print | Other | PRINTING IN PROGRESS | 25 | 0 |

| Rec No | IN-APPARATUS JOB ID | COMPUTER JOB ID | JOB NAME | PAGE | COLOR RATIO | Read Flag |
|---|---|---|---|---|---|---|
| 1 | 1004 | 004 | Job4 | 11/50 | 35 | ON |
| ... | | | | | | ON |
| 40 | | | | 50/50 | 72 | ON |
| 41 | 1005 | — | Job5 | 1/20 | 0 | OFF |
| ... | | | | | | ... |
| 60 | | | | 20/20 | 0 | OFF |
| 61 | 1006 | 006 | Job6 | 1/100 | 15 | ON |
| ... | | | | | | ... |
| 100 | | | | 40/100 | 48 | ON |

| Log No | IN-APPARATUS JOB ID | COMPUTER JOB ID | JOB NAME | TYPE | RESULT | NUMBER OF PAGES | COLOR PAGE | FULL | MIDDLE | LOW | MONOCHROME PAGE |
|---|---|---|---|---|---|---|---|---|---|---|---|
| 1 | 1001 | 001 | Job1 | Print | Printed | 50 | 40 | 10 | 25 | 5 | 10 |
| 2 | 1002 | 002 | Job2 | Print | Canceled | 5 | 2 | 1 | 0 | 1 | 3 |
| 3 | 1003 | — | Job3 | FAX | Printed | 30 | 15 | 5 | 10 | 0 | 15 |
| 4 | 1004 | 004 | Job4 | Print | Printed | 170 | 120 | 35 | 65 | 20 | 50 |
| 5 | 1005 | — | Job5 | Copy | Printed | 20 | 3 | 0 | 1 | 2 | 17 |

821 822 823 824 825 826 827 828 829 830 831 832 / 820

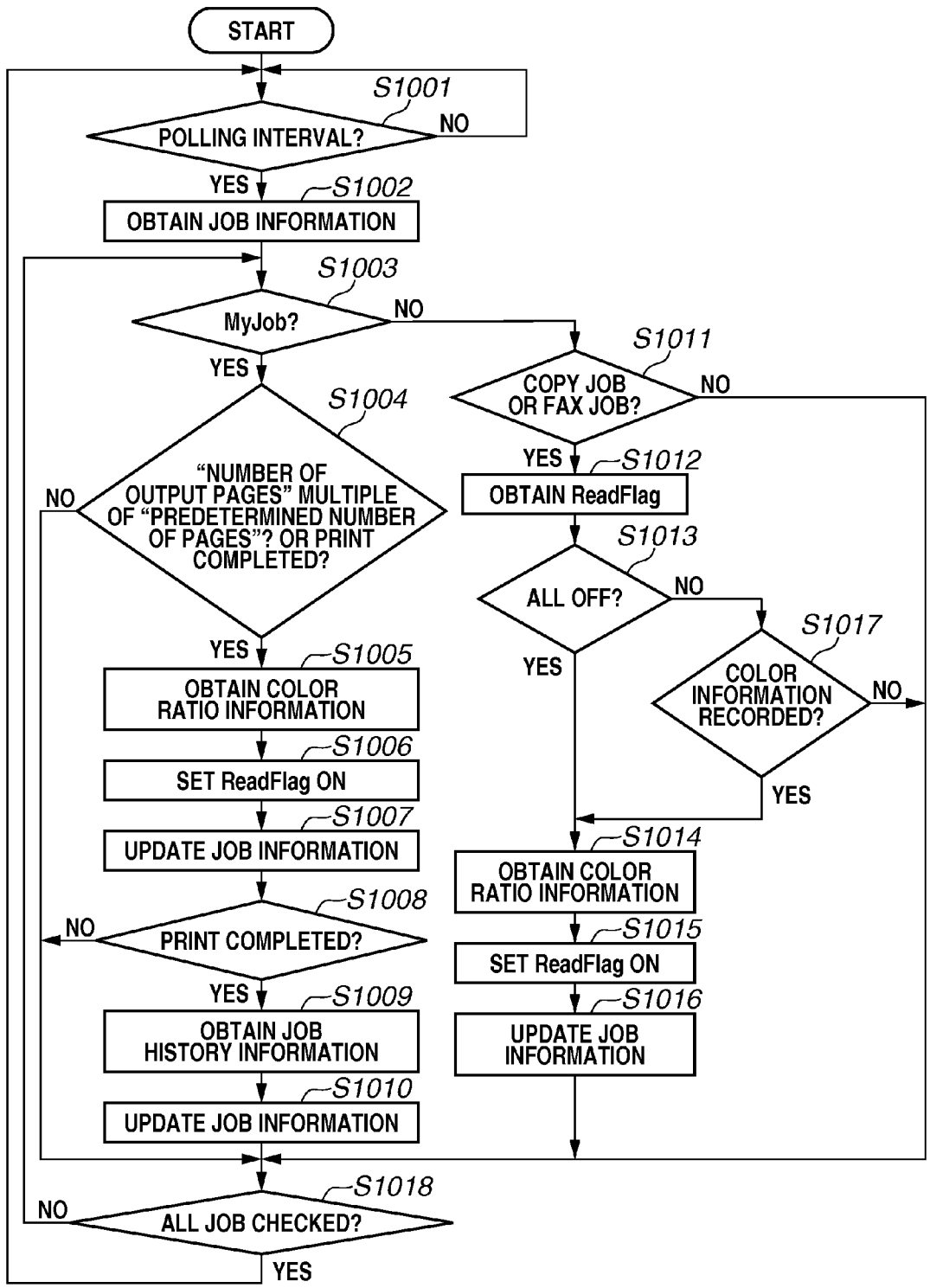

FIG.9A
| Rec No | IN-APPARATUS JOB ID | COMPUTER JOB ID | JOB NAME | PAGE | COLOR RATIO | Read |
|---|---|---|---|---|---|---|
| 1 | 1005 | — | Job5 | 1/20 | 0 | OFF |
| 2 | | | | 2/20 | 0 | OFF |
| 3 | | | | 3/20 | 5 | OFF |
| ... | | | | ... | ... | ... |
| 20 | | | | 20/20 | 0 | OFF |
| 21 | 1007 | — | Job7 | 1/120 | 15 | OFF |
| 22 | | | | 2/120 | 20 | OFF |
| 23 | | | | 3/120 | 15 | OFF |
| ... | | | | ... | ... | ... |
| 100 | | | | 80/120 | 48 | OFF |
FIG.9B
| Rec No | IN-APPARATUS JOB ID | COMPUTER JOB ID | JOB NAME | PAGE | COLOR RATIO | Read |
|---|---|---|---|---|---|---|
| 1 | 1005 | — | Job5 | 1/20, 2/20, 20/20 | 0 | OFF |
| 2 | | | | 3/20 | 5 | OFF |
| ... | | | | ... | ... | ... |
| 18 | | | | 19/20 | 8 | OFF |
| 19 | 1007 | — | Job7 | 1/120, 3/120 | 15 | OFF |
| 20 | | | | 2/120 | 0 | OFF |
| ... | | | | ... | ... | ... |
| 97 | | | | 80/120 | 48 | OFF |
FIG.9C
| Rec No | IN-APPARATUS JOB ID | COMPUTER JOB ID | JOB NAME | PAGE | COLOR RATIO | Read |
|---|---|---|---|---|---|---|
| 1 | 1005 1007 | — — | Job5 Job7 | 1/20, 2/20, 20/20 2/120 | 0 | OFF |
| 2 | 1005 | — | Job5 | 3/20 | 5 | OFF |
| ... | | | | ... | ... | ... |
| 18 | | | | 19/20 | 8 | OFF |
| 19 | 1007 | — | Job7 | 1/120, 3/120 | 15 | OFF |
| ... | | | | ... | ... | ... |
| 96 | | | | 80/120 | 48 | OFF |

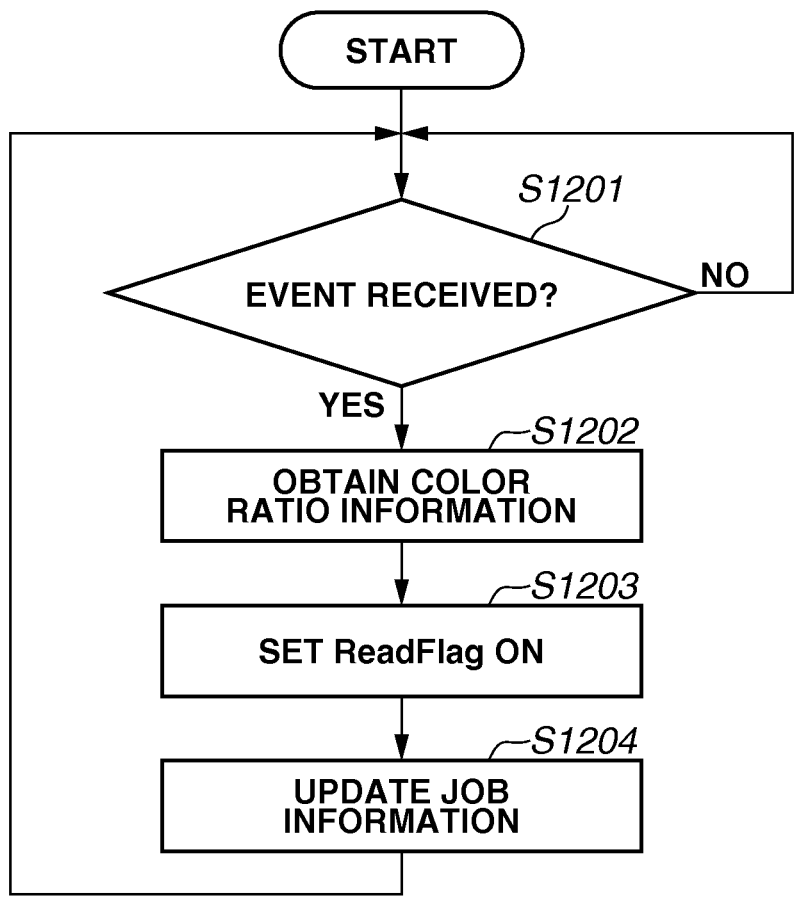

INFORMATION PROCESSING APPARATUS, SYSTEM, METHOD, AND STORAGE MEDIUM

BACKGROUND OF THE INVENTION

1. Field of the Invention

The present disclosure generally relates to information processing and, more particularly, to an information processing apparatus, a system including a printing apparatus and an information processing apparatus, a control method of the system, and a storage medium.

2. Description of the Related Art

Conventionally, a method has been known which determines a usage ratio of each color, namely yellow (Y), magenta (M), and cyan (C) on each page in job data as a print result of a printing apparatus and records as a print log of the job data by determining a counter of color and monochromatic pages (Japanese Patent Application Laid-Open No. 2002-91743).

As a specific exemplary application, a method for counting up a counter at a plurality of stages according to an area (ratio) of color data in a page has been known with respect to the counter of a color page of the above-described print log. More specifically, the counter counts up at three stages in such a manner that it is regarded as "full color" if a color data area is 80% or more, as "middle color" if the color data area is 79% to 21%, and as "low color" if the color data area is 20% or less. Accordingly, a charging system can be realized which is capable of charging an appropriate fee according to a size of a color area though the same in color pages.

Further, a method has been known which records a determination result of a usage ratio of colors on each page to the printing apparatus in addition to the above-described print log. In this method, the determination result is recorded for confirming, in detail per page, how the determination is made to perform the counting recorded in the print log.

In addition, a method has been known which collects, from a host computer, print log information of job data recorded in a printing apparatus and stores the information in a predetermined server apparatus (Japanese Patent Application Laid-Open No. 2000-112706).

However, the above-described conventional systems do not consider a method for managing a print log and a determination result of a color usage ratio of each page by a plurality of host computers accessing a printing apparatus. In this regard, a capacity for storing information is limited in the printing apparatus, and all information pieces cannot be recorded unlimitedly.

A printing apparatus has realized various printing modes, such as outputting job data from a plurality of host computers, directly reading a paper document and outputting as a copy by the printing apparatus, and outputting facsimile (FAX) data received by the printing apparatus. Therefore, a method is required which enables a plurality of host computers to efficiently and certainly obtain a print log and a determination result of a color usage ratio of each page and manage them with respect to all outputs.

Generally, an area reserved for storing a determination result of a color usage ratio in a printing apparatus is often smaller than an area for storing a print log. Therefore, regarding a determination result of a color usage ratio of each page, an older determination result is often overwritten when records of the determination results are over a predetermined number (upper limit) of the printing apparatus. In such a system, when the overwritten determination result of job data is to be confirmed, it is necessary to print the same job data again for the confirmation, and thus resources, such as working hours and sheets are wasted.

SUMMARY OF THE INVENTION

The present disclosure is directed to a solution of the above-described issues. The present disclosure is directed to provision of a mechanism which enables a plurality of information processing apparatuses to efficiently and certainly store log information and information about a color area ratio of each page of the same job therein without duplication, in an environment in which the plurality of information processing apparatuses access to the printing apparatus.

According to an aspect of the present disclosure, a system includes a printing apparatus and an information processing apparatus. The a first management unit configured to manage log information in which a history of a processing result of each job is recorded and a second management unit configured to manage a color information list in which information pieces about a ratio of a color area in each page of a job are stored up to a predetermined upper limit. The information processing apparatus includes an obtaining unit configured to obtain information about a ratio of a color area in each page of a job input by the information processing apparatus itself to the printing apparatus, from the printing apparatus before the information is overwritten in the color information list and a storage unit configured to store information obtained by the obtaining unit together with job identification information, wherein, in a case where information which is not recorded by another information processing apparatus is included in the color information list of the printing apparatus regarding a copy job or a facsimile (FAX) job, the obtaining unit obtains information about a ratio of a color area in each page of the copy job of the FAX job from the printing apparatus.

Further features of the present disclosure will become apparent from the following description of exemplary embodiments with reference to the attached drawings.

BRIEF DESCRIPTION OF THE DRAWINGS

FIG. 1 illustrates an overall configuration of an information processing system as an exemplary embodiment of the present disclosure.

FIG. 2 illustrates an example of hardware configurations of a computer and a printer.

FIG. 3 illustrates an example of each function module in the configuration of the information processing system.

FIG. 4 illustrates an example of a data format of print job data.

FIGS. 5A and 5B illustrate examples of a job information list and a printer information list.

FIGS. 6A and 6B illustrate examples of a color information list and a job log information list.

FIG. 8 is a flowchart illustrating an example of processing executed by a computer according to the first exemplary embodiment.

FIGS. 9A, 9B, and 9C illustrate processing for merging a color information list.

FIG. 11 is a flowchart illustrating an example of processing executed by a computer according to the second exemplary embodiment.

DESCRIPTION OF THE EMBODIMENTS

Figure 7:
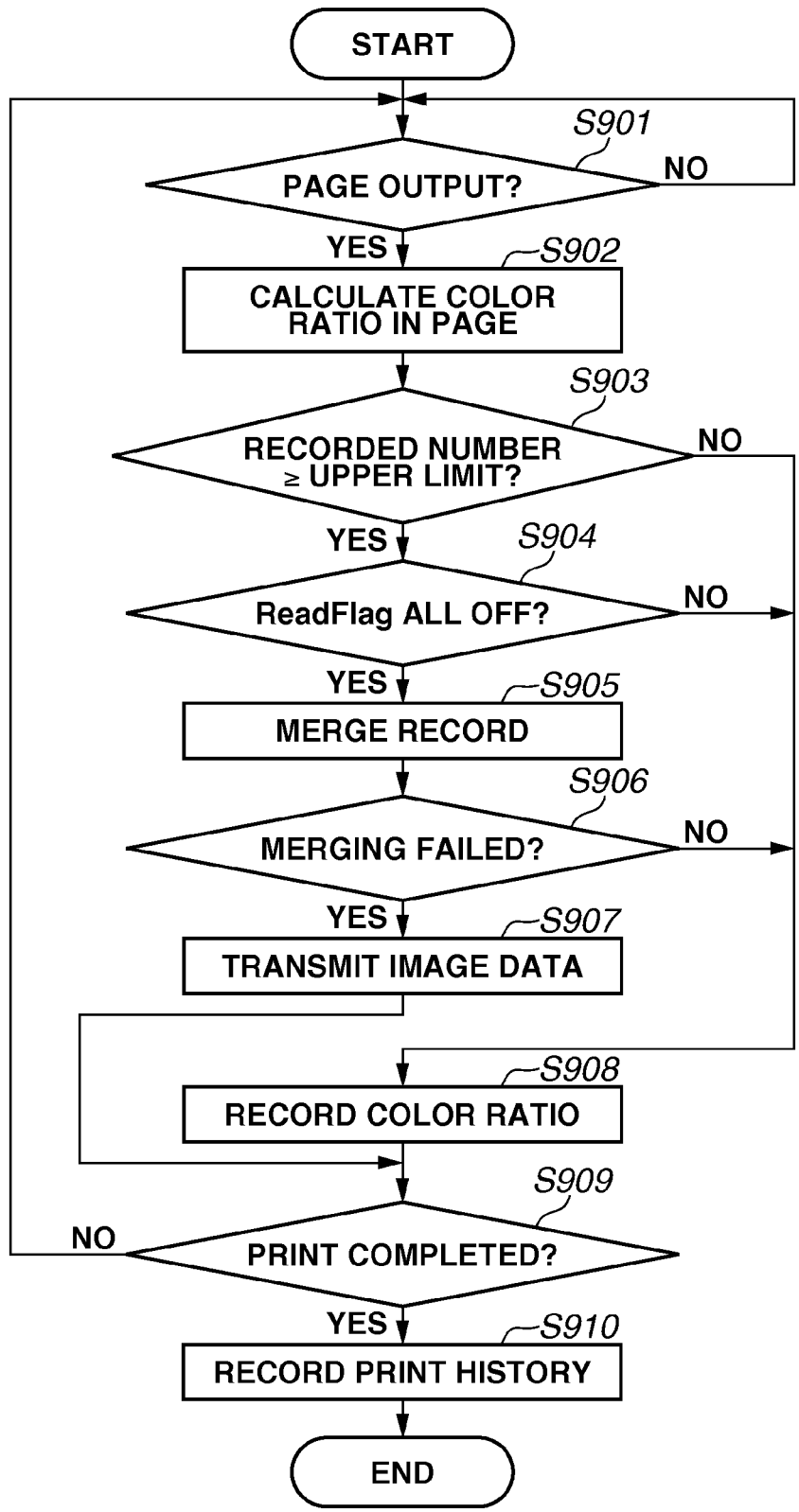
FIG. 7 is a flowchart illustrating an example of processing executed by a printer according to a first exemplary embodiment.

Various exemplary embodiments, features, and aspects of the disclosure will be described in detail below with reference to the drawings.

<Configuration Example of the Information Processing System>

FIG. 1 illustrates an overall configuration of an information processing system as an exemplary embodiment of the present disclosure. An entire environment of the information processing system described below is to facilitate understanding of descriptions of the present disclosure, and the present disclosure is not limited to this environment.

In FIG. 1, network computers (hereinbelow, simply referred to as computers) 101, 102, and 103 are connected to a network 106 and can communicate with each other, and they are typically personal computers (PC). Each of the computers is connected to the network 106 by a network cable such as an Ethernet (registered trademark) cable and can execute various programs such as an application program.

The computers 101, 102, and 103 have a function of transferring print job data for printing generated in the computers 101, 102, and 103 to network printers 104 and 105. Further, the computers 101, 102, and 103 can obtain print job data information and a processing result of the print job data which are received and processed by or stored in the network printers 104 via the network 106 and display them.

The network printers (hereinbelow, simply referred to as printers) 104 and 105 which function as printing apparatuses are connected to the network 106 via network interfaces, which are not illustrated. The printers 104 and 105 analyze print job data including print data transmitted from the computers 101, 102, and 103 and concerts the print job data into a dot image page by page to print it.

The printers 104 and 105 can display the print job data received from the computers 101, 102, and 103 on user interfaces of the printers 104 and 105 and can transmit the print job data to the computers 101, 102, and 103 by an e-mail or the like. Further, the printers 104 and 105 can generate a copy job from data of a paper document scanned by a scanning apparatus to print the job, transmit a facsimile (FAX) to a facsimile apparatus, which is not illustrated, and prints a FAX job received as a FAX.

The printers 104 and 105 further store a processing result of the print job data as a history and notify the computers 101, 102, and 103 thereof in response to a request from them. In the following descriptions, the printers 104 and 105 are respectively referred to as a printer A and a printer B, if they need to be distinguished from one another. In addition, functions of the respective printers may be different from each other.

The network 106 is connected to the computers 101, 102, and 103, the printers 104 and 105, and so on. The network 106 may be a wired network or a wireless network. As described above, the system according to the present exemplary embodiment includes the printing apparatus and the information processing apparatus which handles job data printed by the printing apparatus and a history of a result of the job data printed by the printing apparatus.

<Example of the Hardware Configuration of the Information Processing System>

FIG. 2 illustrates an example of hardware configurations of the computers 101, 102, and 103 and the printers 104 and 105 in the information processing system according to the present exemplary embodiment.

In FIG. 2, a central processing unit (CPU) 201 controls the computer in whole. The CPU 201 executes an application program, a printer control command generation program (hereinbelow, a printer driver), an operating system (OS), an information processing program according to the present exemplary embodiment, and the like which are stored in a program read-only memory (ROM) in a ROM 203 or an external memory 211. The CPU 201 further performs control to temporarily store information and a file necessary for execution of a program in a random access memory (RAM) 202. As used herein, the term "unit" generally refers to any combination of software, firmware, hardware, or other component that is used to effectuate a purpose.

The ROM 203 functions as a storage means and stores a program like a basic in/out (I/O) program and various types of data pieces such as font data used for document processing and template data therein. A data ROM in the ROM 203 and the external memory 211 stores various data pieces to be used in the above-mentioned document processing. The RAM 202 is a temporary storage means and functions as a main memory and a work area of the CPU 201.

A keyboard controller (KBC) 205 controls key inputs from a keyboard 209 and a pointing device, which is not illustrated. A display controller (DSPC) 206 controls display on a display (DSP) 210. A disk controller (DKC) 207 controls an access between the external memory 211. The external memory 211, which are, for example, a hard disk (HD) and a solid state memory (SSD), stores a boot program, various applications, font data, a user file, the printer driver, and the like.

A printer controller (PRTC) 208 is connected to the printers 104 and 105 via a bidirectional interface 21 and executes communication control processing between the printers 104 and 105. A network interface card (NIC) 212 is connected to the network and executes communication control processing among the other apparatuses (including the printers 104 and 105) connected to the network 106.

The CPU 201 can realize a "what you see is what you get" (WYSIWYG) function on the DSP 210 by executing, for example, development (rasterization) processing of an outline font to an information display RAM set on the RAM 202. The CPU 201 further opens various windows registered based on a command indicated by a mouse cursor, which is not illustrated, or the like on the DSP 210 and executes various types of data processing.

The printers 104 and 105 are controlled by a CPU 312. The CPU 312 outputs an image signal as output information to a print unit (printer engine) 317 based on a control program stored in a program ROM in a ROM 313 or a control program stored in an external memory 314. A control program of the CPU 312 and the like are stored in the program ROM in the ROM 313. Font data and the like to be used when the above-described output information is generated are stored in a font ROM in the ROM 313. In the case of a printer which is not provided with the external memory 314 like a hard disk, information and the like to be used in the computers 101, 102, and 103 are stored in a data ROM in the ROM 313.

The CPU 312 can perform communication processing among the computers 101, 102, and 103 via an input unit 318 and notify the computers 101, 102, and 103 of information in the printers or the like. The input unit 318 includes a network controller, which is not illustrated, to connect to the computers 101, 102, and 103 by the network.

A RAM 319 functions as a main memory and a work area of the CPU 312 and is configured to be able to expand a memory capacity by an option RAM connected to an expansion port, which is not illustrated. The RAM 319 is also used as an output information development area, an environmental data storage area, a non-volatile random access memory (NVRAM), and the like. An access of the external memory 314, such as the above-described hard disk (HD) and an integrated circuit (IC) card, is controlled by a memory controller (MC) 320. The external memory 314 is connected as an option and stores font data, an emulation program, form data, and the like. An operation unit 321 includes switches for operations, a light-emitting diode (LED) display device, and the like.

The external memory 314 is not limited to one memory but may include a plurality of memories, and may be configured to be connected to an option card in addition to an internal font and to a plurality of external memories storing a program for interpreting a printer control language of a different language system. Further, a NVRAM, which is not illustrated, may be provided to store printer mode setting information from the operation unit 321.

<Example of the Software Configuration According to the Present Exemplary Embodiment>

FIG. 3 illustrates an example of each function module in the configuration of the information processing system according to the present exemplary embodiment.

A display unit 601 functions as a user interface (not illustrated) for a user to input print settings and a print instruction to perform printing by the printers 104 and 105 and to refer to a processing status and a result of a print job transmitted to the printers 104 and 105.

A job generation unit 602 converts application data selected by a user from the display unit 601 to output data in a format supported by a printer as an output destination and generates print job data as shown in FIG. 4 including print setting information instructed by the user.

A job control unit 603 controls a processing order of the print job data received from the job generation unit 602 and transmits (inputs) the print job data to the printers 104 and 105 via a data transmission reception unit 604. The job control unit 603 issues a job identification (ID) (job identification information) for identifying a job in the computer and adds the job ID to header information (described below) of the print job data generated by the job generation unit 602. The job control unit 603 further stores the print job data transmitted to the printers 104 and 105 in a job data storage unit 606 via a job information management unit 605. The stored print job data is used when a reprinting instruction is received from a user.

The data transmission reception unit 604 transmits the print job data to the printers 104 and 105 via the network 106 and receives information of the printers 104 and 105. The data transmission reception unit 604 is provided with a transmission buffer for temporarily storing data to be transmitted to the printers 104 and 105 and a reception buffer for temporarily storing data received from the printers 104 and 105.

The job information management unit 605 manages the print job data shown in FIG. 4 generated by the job generation unit 602 and a job information list shown in FIG. 5A. The job information list includes the print job data information transmitted to the printers 104 and 105. The information managed by the job information management unit 605 is displayed on a user interface (not illustrated) via the display unit 601.

The job data storage unit 606 stores the print job data shown in FIG. 4 generated by the job generation unit 602. The job data storage unit 606 can further store output development data generated by a drawing output unit 623 in the printers 104 and 105. The print job data and the output development data are managed by being associated with a job ID 721 and an in-apparatus job ID 723 which are stored in a job information storage unit 607.

The job information storage unit 607 stores the print job data information transmitted from the computer 101 and others to the printers 104 and 105 as the job information list shown in FIG. 5A. The job information storage unit 607 stores information about a processing result (a print result, a number of color/monochromatic pages, a color ratio of each page, and so on) of a print job obtained from the printers 104 and 105 via the data transmission reception unit 604. The job information storage unit 607 can also store print job information transmitted from other computers and information about a copy job and a FAX job executed by the printers 104 and 105.

A printer information management unit 608 manages information obtained from the printers 104 and 105. The information managed by the printer information management unit 608 includes information about a job (a print job, a copy job, and a FAX job) in the printers 104 and 105 and a status and an option configuration of the printers 104 and 105 as shown in FIG. 5B. The information managed by the printer information management unit 608 is displayed on the user interface (not illustrated) via the display unit 601.

A printer information storage unit 609 stores the print job data information existing in the printers 104 and 105 as a printer information list shown in FIG. 5B. The printer information storage unit 609 also stores information (not illustrated) about the status and the option configuration of the printers 104 and 105 in addition to the job information.

Modules described above as the unit 601 to 605 and 608 correspond to functions to be realized by the CPU 201 in the computers 101, 102, and 103 executing a program stored in the external memory 211, and thereby realizes processing described below with reference to FIG. 8 or the like. Further, the above-described units 606, 607, and 609 are realized as storage areas of, for example, the external memory 211 in the computers 101, 102, and 103.

A data transmission reception unit 621 receives the print job data from the computers 101, 102, and 103 via the network 106, receives a FAX job from a facsimile apparatus, which is not illustrated, and transmits information of the printers 104 and 105. The data transmission reception unit 621 is provided with a transmission buffer for temporarily storing data to be transmitted to the respective computers and a reception buffer for temporarily storing data received from the respective computers.

A printer control unit 622 controls processing performed by the printers 104 and 105. The printer control unit 622 instructs the drawing output unit 623 to perform drawing processing on a print job received from the respective computers and a FAX job received from the facsimile apparatus. The printer control unit 622 further performs control to transmit the information of the printer 104 to the respective computers via the data transmission reception unit 621.

The drawing output unit 623 performs drawing development of a character and an image for outputting from a printer and output the developed data. The drawing output unit 623 develops the job data into an output data format by creating a character pattern relevant to the job data and performing calculation of diagrams, development processing of image data, and the like, then transmits the output development data to a printer engine 624. The printer engine 624 actually performs print output processing using a mechanism like an electrophotographic method according to the output development data received from the drawing output unit 623.

A color determination unit 625 detects an area of a color image in each page with respect to the image data developed by the drawing output unit 623 and calculates a usage ratio of the color image in a page. As for a method for detecting a color image area by the color determination unit 625, there is a method for detecting a color image area by pixel, a method for dividing a page into specific size areas and counting the number of areas including a color image, or the like. The usage ratio of color image in each page calculated by the color determination unit 625 is recorded by page to a color information storage unit 627 as a color information list as shown in FIG. 6A.

A job log management unit 626 manages a print output result of the printer engine 624 as a history of a print job. The job log management unit 626 counts a color counter in a print job from a calculation result of a color ratio by the color determination unit 625 according to a predetermined rule. More specifically, with respect to a color counter in three stages (Full, Middle, and Low), the color counter is counted by page according to a predetermined rule (for example, a color ratio of 80% or more is counted as Full, 21 to 79% is counted as Middle, and 20% or less is counted as Low). The job log management unit 626 records the print output result of the printer engine 624 and a color counter result to a job log storage unit 628 as a job log information list shown in FIG. 6B.

The color information storage unit 627 records a ratio of a color area in each page in a print job, a copy job, and a FAX job as the color information list shown in FIG. 6A.

The job log storage unit 628 records a print processing result of a print job, a copy job, and a FAX job as a history in the job log information list shown in FIG. 6B. Storage areas of the color information storage unit 627 and the job log storage unit 628 have an upper limit. In addition, according to the present exemplary embodiment, the color information list stored and managed by the color information storage unit 627 is information for confirmation and is not always used, so that only an area smaller than the job log storage unit 628 is reserved. Thus, the color information list stored in the color information storage unit 627 reaches the upper limit relatively quickly and may possibly be overwritten.

A document reading unit 629 reads paper documents in order from the beginning. The document reading unit 629 reads and scans a paper document via a charge coupled device (CCD) image sensor, which is not illustrated, and generates data as a copy job. The generated copy job is transmitted to the drawing output unit 623 and output from the printer engine 624.

Modules described above as the unit 621 to 626 and 629 correspond to functions to be realized by the CPU 312 in the printers 104 and 105 executing a program stored in the ROM 313 or the external memory 314, and thereby realizes processing described below with reference to FIG. 7 or the like. Further, the above-described units 627 and 628 are realized as storage areas of, for example, the external memory 314 in the printers 104 and 105.

<Example of Print Job Data, Job Information, and Printer Information According to the Present Exemplary Embodiment>

Print job data and a job information list managed by the job information management unit 605 and a printer information list managed by the printer information management unit 608 in the computers 101, 102, and 103 of the information processing system according to the present exemplary embodiment are described below with reference to FIG. 4 and FIGS. 5A and 5B.

FIG. 4 illustrates a data format of print job data 710 stored in the job data storage unit 606. The print job data 710 includes data necessary for the printers 104 and 105 to perform printing.

Header information 711 includes information necessary to transmit the print job data to the printers 104 and 105 and print job data information to be transmitted. A job ID for identifying a print job is added to the header information 711 by the job control unit 603.

Output setting information 712 includes an output setting for performing an instruction to the printers 104 and 105. The output setting information is generated from a print setting instructed by a user to the display unit 601. The print setting includes, for example, a number of print copies, an output sheet, one-sided or two-sided printing, and a finishing setting.

Output data 713 includes drawing information of the output data to be drawn by the printers 104 and 105. The output data 713 can further include developed output data generated by the drawing output unit 623 in the printers 104 and 105.

The format of the print job data 710 is not limited to the above-described one, and any format can be employed as long as print setting information and drawing information of print data as a print target can be identified.

FIG. 5A illustrates an example of a job information list 720 stored in the job information storage unit 607. The job information list 720 includes information pieces indicating a processing status and a processing result of a job (a print job, a copy job, and a FAX job) in the printers 104 and 105.

More specifically, the job information list 720 includes the job ID 721 for identifying a job issued by the computer (the job control unit 603), an output destination printer 722, and the in-apparatus job ID 723 assigned by the printer. The job information list 720 further includes a job name 724, a type 725 indicating a type of the job (a print job, a copy job, or a FAX job), and a status 726 of the job. The job information list 720 further includes a number of color pages 727 determined by the color determination unit 625 in the printers 104 and 105, Full 728, Middle 729, and Low 730 which are the three stage counters as a breakdown of the number of color pages 727, and a number of monochromatic pages 731. The job information list 720 furthermore includes ratio information of a color image in each page 732 (a color ratio 733).

Obtainment of the information in the job information list 720 is performed according to reception from the printer information management unit 608 (update of a printer information list 740 shown in FIG. 5B) and is realized by the job information management unit 605 inquiring it of the printers 104 and 105 via the data transmission reception unit 604.

A timing to make the inquiry to the printers 104 and 105, regarding history information of the number of color pages 727 to the number of monochromatic pages 731, is a timing when the status 726 shifts to a status indicating completion of the processing (for example, "printed"). Regarding the color ratio 733, it is obtained at a predetermined timing. The predetermined timing is determined based on the number of pages subjected to output processing by the printer engine 624. A value of the number of pages is determined by a storage capacity of the color ratio information in the printer (an upper limit of a color information list 810 shown in FIG. 6A). This value may be previously defined in the information processing system according to the present exemplary embodiment, or an appropriate value may be calculated according to a print capability (a processing speed) of the printers 104 and 105 or the like.

FIG. 5B illustrates an example of the printer information list 740 stored in the printer information storage unit 609. The printer information list 740 includes information pieces indicating statuses of all jobs (a print job, a copy job, and a FAX job) being processed in the printers 104 and 105.

More specifically, the printer information list 740 includes an output destination printer 741, an in-apparatus job ID 742 assigned by the printers 104 and 105, and a computer job ID 743 issued by the computer (the job control unit 603). The printer information list 740 further includes a job name 744, a type 745 indicating a type of the job (a print job, a copy job, or a FAX job), a job issuer 746 indicating an issuer of the job, and a job status 747. The printer information list 740 furthermore includes a total number of pages 748 of the job and a number of output pages 749 indicating the number of pages output from the printer engine 624. The job issuer 746 is determined by the printer information management unit 608 checking the computer job ID 743. More specifically, if a job ID issued by the job control unit 603 matches with the computer job ID 743 obtained from the computer, the job is regarded as the print job data issued by the computer itself, and the job issuer becomes "MyJob". If the job ID does not match, the job is regarded as the one issued by another computer or a copy job or a FAX job, and the job issuer becomes "Other".

Obtainment of the information in the printer information list 740 is realized in such a manner that the printer information management unit 608 in each of the computers periodically inquires a job status of each printer via the data transmission reception unit 604 (hereinbelow, referred to as "polling processing").

According to the present exemplary embodiment, a method for recording the job information list 720 and the printer information list 740 as different lists is described, however, these two lists may be recorded as one list.

<Example of Print Job Data, Job Information, and Printer Information According to the Present Exemplary Embodiment>

FIGS. 6A and 6B illustrate an example of the color information list managed by the color determination unit 625 and the job log information list managed by the job log management unit 626 in the printers 104 and 105 of the information processing system according to the present exemplary embodiment.

FIG. 6A illustrates the color information list 810 stored in the color information storage unit 627. In the color information list 810, a color area ratio in each page in a print job, a copy job, and a FAX job is recorded. Regarding the printers 104 and 105, an upper limit (for example, 100 pages) is set to the number of information pieces to be recorded in the color information list according to the upper limit of the storage area of the printer. In other words, when the number of information pieces reaches the upper limit, old information is overwritten with new information.

The color information list 810 includes Rec No 811 indicating a record number and an in-apparatus job ID 812 assigned by the printer. The color information list 810 further includes a computer job ID 813 issued by the computer (information that the printer control unit 622 obtains from the header information 711 in the print job). The color information list 810 further includes a job name 814, a number of pages 815 indicating the number of pages in the job, a color ratio 816 indicating a ratio of a color area, and a ReadFlag 817 as a flag indicating that the information about the color ratio is read by either computer. If the information has been read, a value of the ReadFlag 817 becomes "ON", and if not, the value becomes "OFF".

FIG. 6B illustrates a job log information list 820 stored in the job log storage unit 628. In the job log information list 820, a processing result of a print job, a copy job, or a FAX job by the printers 104 and 105 is recorded as a history.

The job log information list 820 includes a Log No 821 indicating a job log number and an in-apparatus job ID 822 assigned by the printer. The job log information list 820 further includes a computer job ID 823 issued by the computer, a job name 824, a type 825 indicating a type of the job (a print job, a copy job, or a FAX job), and a result 826 indicating a processing result of the job. The job log information list 820 furthermore includes a number of pages 827 indicating a total number of pages in the job subjected to the output processing by the printer engine 624.

In addition, the job log information list 820 includes a color page 828 and a monochromatic page 832 respectively indicating the number of color pages and the number of monochromatic pages as a breakdown of the number of pages 827. Further, Full 829, Middle 830, and Low 831 respectively indicating the number of full color pages, the number of middle color pages, and the number of low color pages are included as a breakdown of the color page 828. As described above, full color, middle color, and low color are allocated by comparing a ratio value of a color image included in a page of a job determined by the color determination unit 625 with threshold values which are previously defined in the printer.

The job log information list 820 may include information about the number of output pages in sheet unit and the number of pages in print setting unit (for example, one-sided or two-sided printing) as a breakdown of the number of pages in addition to the above-described information pieces.

<Print Processing Sequence of the Printer According to the Present Exemplary Embodiment>

FIG. 7 is a flowchart illustrating an example of processing for updating the color information list 810 and the job log information list 820 when the printer 104 or 105 performs printing in the information processing system according to the first exemplary embodiment. The processing illustrated in the flowchart is realized by the CPU 312 in the printers 104 and 105 executing a program stored in the ROM 313, the external memory 314, or the like.

In step S901, the color determination unit 625 determines whether developed output data is output with respect to a new page in the drawing output unit 623. If it is determined that the data is not output (NO in step S901), the color determination unit 625 repeats the determination in step S901. Whereas if it is determined that the data is output (YES in step S901), the color determination unit 625 advances the processing to step S902.

In step S902, the color determination unit 625 calculates a ratio of a color image included in a page with respect to the developed output data output in step S901.

Next, in step S903, the color determination unit 625 determines whether the number of records in the color information list 810 stored in the color information storage unit 627 reaches the upper limit (for example, 100 records) of the printer. If it is determined that the records do not reach the upper limit (NO in step S903), then in step S908, the color determination unit 625 records color ratio information of a target page in the color information list 810 in the color information storage unit 627. In this case, the color ratio information is added to a blank record without overwriting.

On the other hand, if it is determined that the records reach the upper limit (YES in step S903), the color determination unit 625 advances the processing to step S904. In step S904, the color determination unit 625 determines whether values of the ReadFlag 817 in the color information list 810 stored in the color information storage unit 627 are "OFF" in all records. In other words, it is determined whether all records are read from the computers 101, 102, and 103. If it is determined that any of the records having the value "ON" exists (NO in step S904), then in step S908, the color determination unit 625 records the color ratio information of the target page in the color information list 810 in the color information storage unit 627. In this case, the record in which the value of the ReadFlag 817 is "ON" is overwritten.

On the other hand, if it is determined that the values of the ReadFlag 817 are "OFF" in the all records (YES in step S904), the color determination unit 625 advances the processing to step S905. In step S905, the color determination unit 625 executes merging (compressing) processing on the color information list 810 stored in the color information storage unit 627. The merging processing compresses a plurality records stored in the color information storage unit 627 into one record to secure the storage area. The merging processing is described in detail below with reference to FIGS. 9A to 9C.

Next, in step S906, the color determination unit 625 determines whether to fail the merging processing performed in step S905. In other words, the color determination unit 625 determines whether there is no information to be merged and the reduction (compression) of the color information list 810 cannot be realized. If it is determined that the merging is successful (NO in step S906), then in step S908, the color determination unit 625 records the color ratio information of the target page in the color information list 810 in the color information storage unit 627. In this case, the color ratio information is added to a record which becomes a blank by the above-described merging processing without overwriting.

On the other hand, if it is determined that the merging is a failure (YES in step S906), the color determination unit 625 advances the processing to step S907. In step S907, the color determination unit 625 transmits the developed output data (image data) output in step S901 to the computer 101, 102, or 103 via the data transmission reception unit 621. In this case, information which can specify a job and a page number, such as a job ID and a page number is transmitted as well. A transmission destination is a computer which receives the target job (a transmission source of the target job). If the job is a copy job or a FAX job, the data is transmitted to a predetermined computer according to a predetermined rule. The predetermined rule is, for example, a priority order which is preliminarily stored in the printer, and the job is transmitted according to the predetermined rule.

In the computer which received the developed output data transmitted in step S907, the job information management unit 605 stores the developed output data in the job data storage unit 606. In addition, the computer calculates a color ratio in a page by analyzing the developed output data at an arbitrary timing and updates the job information list 720 in the job information storage unit 607 based on the calculation result. In step S907, the developed output data output in step S901 is transmitted to the computer, however, the color ratio information calculated in step S902 may be transmitted to the computer by converting, for example, a comma separated value (CSV) file.

When the processing in step S907 is finished, the color determination unit 625 advances the processing to step S909 without recording the color ratio information of the target page to the color information list 810 in the color information storage unit 627. The output data is transmitted to the computer in step S907, and thus the color ratio information of the target page is not recorded here. Therefore, the color ratio information is not overwritten.

Next, in step S909, the color determination unit 625 determines whether color determination is completed with respect to all pages in the job (in other words, print output processing (printing) is completed). If it is determined that the color determination is not completed yet (NO in step S909), the color determination unit 625 advances the processing to step S901.

On the other hand, if it is determined that the color determination is completed (YES in step S909), the color determination unit 625 notifies the job log management unit 626 of the completion. According to the notification from the color determination unit 625, in step S910, the job log management unit 626 records the output result of the printer engine 624 to the job log information list 820 in the job log storage unit 628 as a print history.

<Processing Sequence of the Computer According to the Present Exemplary Embodiment>

FIG. 8 is a flowchart illustrating an example of processing executed by the computers 101, 102, and 103 in the information processing system according to the first exemplary embodiment to obtain information about a print status and a result of the printer 104 or 105. The processing illustrated in the flowchart is realized by the CPU 201 in the computers 101, 102, and 103 executing a program stored in the external memory 211. In this regard, a processing flow that the computer 101 obtains information from the printer A (104) is described below, however, the same processing is performed when the information is obtained from the printer B (105).

In step S1001, the printer information management unit 608 determines whether an interval of polling processing for obtaining the information from the printer A has elapsed. If it is determined that the interval of the polling processing has not elapsed (NO in step S1001), the printer information management unit 608 repeats the determination in step S1001. Whereas if it is determined that the interval of the polling processing has elapsed (YES in step S1001), the printer information management unit 608 advances the processing to step S1002.

In step S1002, the printer information management unit 608 obtains job information from the printer A via the data transmission reception unit 604 and updates the printer information list 740 in the printer information storage unit 609 based on the obtained information. The obtained information is also notified to the job information management unit 605.

Then, the job information management unit 605 repeats the processing in step S1003 to step S1017 to the number of jobs of which information pieces are obtained in step S1002.

In step S1003, the job information management unit 605 selects a job which is not yet processed in step S1003 to step S1017 from the jobs obtained in step S1002 and sets the selected job as a target job. Further, the job information management unit 605 determines whether the target job is "MyJob" (the job issuer 746 in the printer information list 740 obtained via the printer information management unit 608 is "MyJob") or not. In other words, the job information management unit 605 determines that the target job is a job input by the computer itself. If it is determined that the target job is not "MyJob" (NO in step S1003), the job information management unit 605 advances the processing to step S1011. Whereas if it is determined that the target job is "MyJob" (YES in step S1003), the job information management unit 605 advances the processing to step S1004.

In step S1004, the job information management unit 605 determines whether the number of output pages of the target job output by the printer A reaches multiples of the predetermined number of pages or print output of the target job is completed. The multiples of the predetermined number of pages is used in such a manner that if the predetermined number of pages is 10 pages, for example, it is determined whether the number of pages reaches 10 pages, 20 pages, and so on. As described above, the predetermined number of pages may be previously defined in the information processing system according to the present exemplary embodiment, or an appropriate value may be calculated according to a print capability (a processing speed) of the printer A. If it is determined that the number of output pages does not reach the predetermined number of pages and print output is not completed (NO in step S1004), the job information management unit 605 advances the processing to step S1018.

On the other hand, if it is determined that the number of output pages reaches the predetermined number of pages or print output is completed (YES in step S1004), the job information management unit 605 advances the processing to step S1005. In step S1005, the job information management unit 605 obtains color ratio information (information in the color information list 810) of a page which is not yet obtained in the target job from the printer A via the data transmission reception unit 604.

Next, in step S1006, the job information management unit 605 instructs the printer A via the data transmission reception unit 604 to set the ReadFlag 817 of the page of which color ratio information is obtained in step S1005 to "ON". The color determination unit 625 in the printer A rewrites a value of the ReadFlag 817 of the target page in the color information list 810 in the color information storage unit 627 to "ON" in response to the above-described instruction.

Next, in step S1007, the job information management unit 605 updates the job information list 720 in the job information storage unit 607 with the information obtained in step S1005. More specifically, the page 732 and the color ratio 733 in the job information list 720 are updated.

Next, in step S1008, the job information management unit 605 determines whether print output processing of the target job is completed (i.e., printing is completed) in the printer A. If it is determined that the print output processing is not completed (NO in step S1008), the job information management unit 605 advances the processing to step S1018.

On the other hand, if it is determined that the print output processing is completed (YES in step S1008), the job information management unit 605 advances the processing to step S1009. In step S1009, the job information management unit 605 obtains print history information (information in the job log information list 820) of the target job recorded in the job log storage unit 628 of the printer A via the data transmission reception unit 604.

Next, in step S1010, the job information management unit 605 updates the job information list 720 in the job information storage unit 607 with the information obtained in step S1009. More specifically, the contents of the status 726 to the number of monochromatic pages 731 in the job information list 720 are updated. When the processing in step S1010 is finished, the job information management unit 605 advances the processing to step S1018.

In step S1003, if it is determined that the target job is not "MyJob" (NO in step S1003), the job information management unit 605 performs the processing in step S1011. In step S1011, the job information management unit 605 determines whether the target job is a copy job or a FAX job (whether the type 745 in the printer information list 740 obtained via the printer information management unit 608 is "Copy" or "FAX"). If it is determined that the target job is not a copy job or a FAX job (NO in step S1011), the job information management unit 605 advances the processing to step S1018.

On the other hand, if it is determined that the target job is a copy job or a FAX job (YES in step S1011), the job information management unit 605 advances the processing to step S1012. In step S1012, the job information management unit 605 obtains the value of the ReadFlag 817 of the target job in the color information list 810 recorded in the color information storage unit 627 from the printer A via the data transmission reception unit 604.

Next, in step S1013, the job information management unit 605 determines whether the values of the ReadFlag 817 obtained in step S1012 are "OFF" in all pages. If it is determined that all values are "OFF" (YES in step S1013), the job information management unit 605 advances the processing to step S1014.

On the other hand, if it is determined that any one of page has the value "ON" (NO in step S1013), the job information management unit 605 advances the processing to step S1017. In step S1017, the job information management unit 605 determines whether the color ratio information of the target job is already recorded in the job information list 720 in the job information storage unit 607. If it is determined that the color ratio information of the target job is recorded (YES in step S1017), the job information management unit 605 advances the processing to step S1014 and obtains the color ratio information. Whereas if it is determined that the color ratio information of the target job is not recorded (NO in step S1017), the job information management unit 605 advances the processing to step S1018. More specifically, if the color ratio information of the target job has been obtained by the computer in the past, the color ratio information is obtained on a continuing basis. If the color ratio information of the target job has not been obtained in the past, the color ratio information of the target job is not obtained (by determining that the information has already been obtained by the other computer).

In step S1014, the job information management unit 605 obtains the color ratio information (information in the color information list 810) of the page which is not yet obtained in the target job from the printer A via the data transmission reception unit 604.

Next, in step S1015, the job information management unit 605 instructs the printer A via the data transmission reception unit 604 to set the ReadFlag 817 of the page of which color ratio information is obtained in step S1014 to "ON". The color determination unit 625 in the printer A rewrites the value of the ReadFlag 817 of the target page in the color information list 810 in the color information storage unit 627 to "ON" in response to the above-described instruction.

Next, in step S1016, the job information management unit 605 updates the job information list 720 in the job information storage unit 607 with the information obtained in step S1014. More specifically, the page 732 and the color ratio 733 in the job information list 720 are updated. When the processing in step S1016 is finished, the job information management unit 605 advances the processing to step S1018.

In step S1018, the job information management unit 605 determines whether checking (the processing in step S1003 to step S1017) is completed on all jobs obtained in step S1002. If it is determined that the checking is not completed on all jobs (NO in step S1018), the job information management unit 605 advances the processing to step S1003 and selects a next job as a target job. Whereas if it is determined that the checking is completed on all jobs (YES in step S1018), the job information management unit 605 advances the processing to step S1001.

By performing the above-described processing, the information processing system according to the present exemplary embodiment can efficiently store print job data processed by each printer or information about a copy job and a FAX job in any one of the computers. In other words, the information processing system according to the present exemplary embodiment can store print job data and information about a copy job and a FAX job without performing needless processing (communication) for obtaining the same information pieces from a plurality of computers with respect to the same job. As a result, regarding print job data, a computer which transmits the print job data to a printer obtains the information by itself, and regarding a copy job and a FAX job, a computer which accesses the relevant job first obtains and stores the information. Accordingly, if the information is overwritten in the printer, a user can check a previous result on the computer without outputting the job again.

According to the present exemplary embodiment, a method for performing polling processing is described regarding a timing that a computer obtains information from a printer. However, regarding a timing for obtaining information, information may be obtained in such a manner that a printer notifies a computer of an event of changing information and the information may be obtained according to the event.

Further, according to the present exemplary embodiment, regarding print job data, a computer which transmits the print job data obtains the information by itself, however, another computer may obtain the print job data information in place of the computer. More specifically, if there are records of which values of the ReadFlag 817 in the past print job data are all "OFF", another computer obtains information in place of the computer. For example, a computer which has transmitted the print job data currently being in the process of print output checks the ReadFlag 817 of immediately preceding print job data, and if the values are all "OFF", the computer obtains information of the immediately preceding print job data as well. Accordingly, if the computer is down, the information is surely stored in any of the computers.

Further, according to the present exemplary embodiment, color ratio information of each page is only obtained with respect to a copy job and a FAX job as information to be obtained from the computer. However, print history information (information in the job log information list 820) may be obtained according to completion of print output.

<Example of Merging Processing of the Color Information List 810 According to the Present Exemplary Embodiment>

FIGS. 9A, 9B, and 9C illustrate an example of processing for merging (compressing) the color information list 810 (transition of list update) by the color determination unit 625 in the printers 104 and 105 in step S905 shown in FIG. 7 in the information processing system according to the present exemplary embodiment.

In FIGS. 9A, 9B, and 9C, the merging processing is performed on the color information list 810 in the order of FIG. 9A, FIG. 9B, and FIG. 9C. In the process from FIG. 9A to FIG. 9B, the merging processing is performed on pages of which color ratios are the same in the same job. More specifically, regarding "Job 5", color information pieces of a page 1/20, a page 2/20, and a page 20/20 of which color ratios are 0% are merged. Further, regarding "Job 7", color information pieces of a page 1/120 and a page 3/120 of which color ratios are 15% are merged.

In the process from FIG. 9B to FIG. 9C, the merging processing is performed on pages of which color ratios are the same among the different jobs. More specifically, color information pieces of the page 1/20, the page 2/20, and the page 20/20 in "Job 5" and a page 2/120 in "Job 7" of which color ratios are 0% are merged.

As described above, merging of the color information list 810 can unify a plurality records into one record and reduce the total number of records, so that the printers 104 and 105 can store color ratio information more efficiently. Accordingly, a possibility of overwriting color ratio information in the printers 104 and 105 due to a delay in information obtainment processing from the computers 101, 102, and 103 can be reduced.

According to the above-described first exemplary embodiment, a configuration is described which can prevent color ratio information from being overwritten by performing merging processing and transmission processing of developed output data in a case where the number of color ratio information pieces of each page which are not read yet and stored in each printer (the number of records of which ReadFlag is "OFF") reaches the upper limit. However, not only the merging processing and the transmission processing of developed output data, it may be configured to cause the printers 104 and 105 to notify the computers 101, 102, and 103 of an event indicating an information obtainment request to the computer.

A second exemplary embodiment is described below in which the computers 101, 102, and 103 obtain color ratio information in response to an event notified from the printers 104 and 105, and portions different from the first exemplary embodiment are mainly described in detail with reference to the drawings.

<Print Processing Sequence of the Printer According to the Present Exemplary Embodiment>

Figure 10:
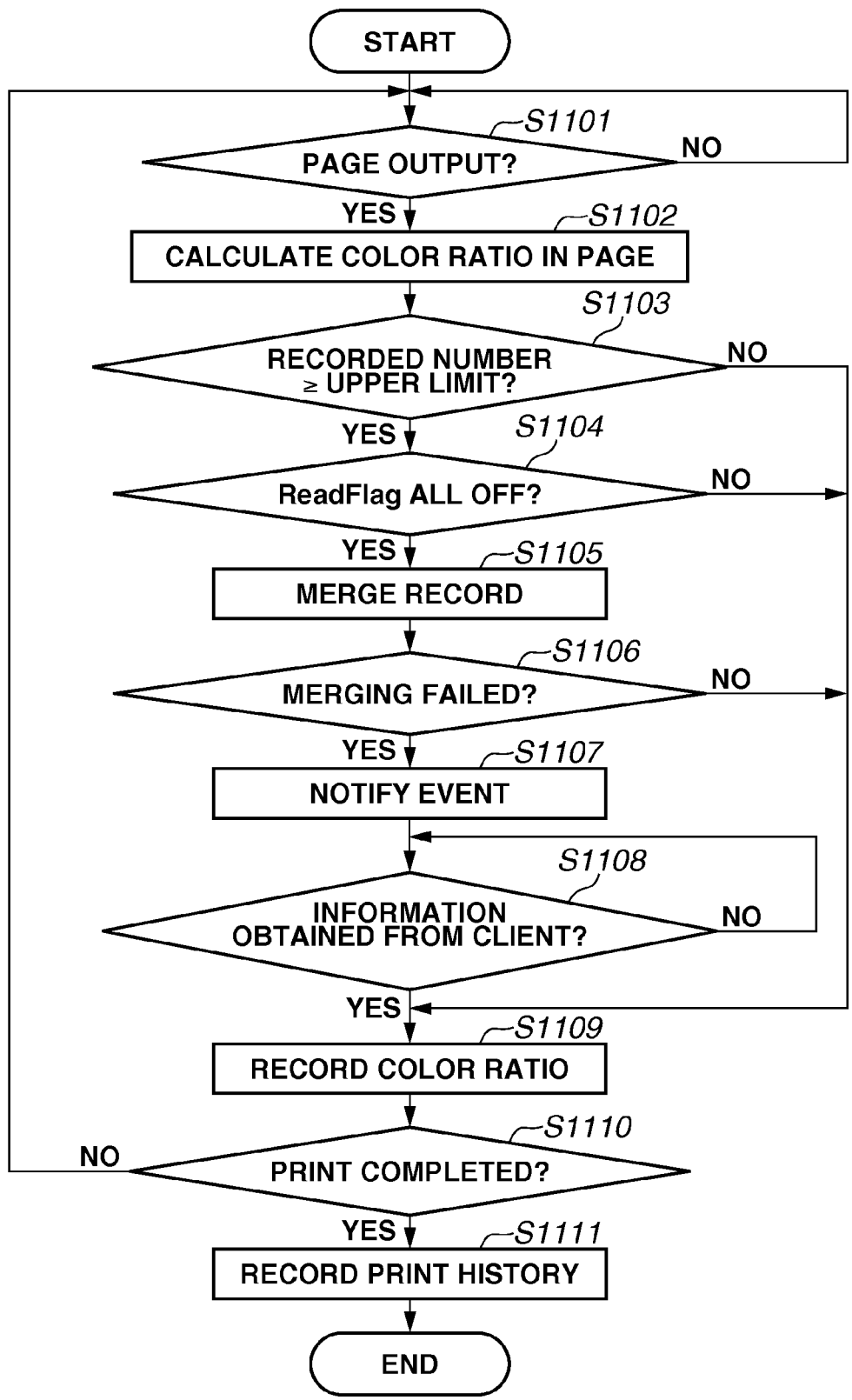
FIG. 10 is a flowchart illustrating an example of processing executed by a printer according to a second exemplary embodiment.

FIG. 10 is a flowchart illustrating an example of processing for updating the color information list 810 and the job log information list 820 when the printer 104 or 105 performs printing in the information processing system according to the second exemplary embodiment. The processing illustrated in the flowchart is realized by the CPU 312 in the printers 104 and 105 executing a program stored in the ROM 313, the external memory 314, or the like.

The processing in step S1101 to step S1106 are the same as those in step S901 to step S906 in FIG. 7, thus the descriptions thereof are omitted. In step S1107, the color determination unit 625 transmits an obtainment event (request) of the color ratio information of the job to the computer 101, 102, or 103 via the data transmission reception unit 621. A transmission destination is the computer which received the target job. If no transmission destination computer exists (in a case an event notification failed due to power shutdown or the like), or information pieces recorded in the color information list 810 are only a copy job or a FAX job, an event is notified to the computer according to the predetermined rule. The predetermined rule is, for example, a priority order which is preliminarily stored in the printer, and the event is notified according to the predetermined rule. The computer received the event notification executes obtainment of the color information.

Next, in step S1108, the color determination unit 625 determines whether the obtainment of the color information is executed from the computer which notifies of the event in step S1107. If it is determined that the obtainment of the color information is not executed yet (NO in step S1108), the color determination unit 625 repeats the processing in step S1108.

On the other hand, if it is determined that the obtainment of the color information is executed (YES in step S1108), the color determination unit 625 advances the processing to step S1109. The processing in step S1109 to step S1111 are the same as those in step S908 to step S910 in FIG. 7, thus the descriptions thereof are omitted.

<Processing Sequence of the Computer According to the Present Exemplary Embodiment>

FIG. 11 is a flowchart illustrating an example of processing executed by the computers 101, 102, and 103 to obtain color ratio information in a job in response to an event notification for color ratio information obtainment from the printer 104 or 105 in the information processing system according to the second exemplary embodiment. The processing illustrated in the flowchart is realized by the CPU 201 in the computers 101, 102, and 103 executing a program stored in the external memory 211. In this regard, a processing flow that the computer 101 obtains information from the printer A (104) is described below, however, the same processing is performed when the information is obtained from the printer B (105).

In step S1201, the job information management unit 605 determines whether an event indicating an obtainment request for color ratio information is received from the printer A via the data transmission reception unit 604. If it is determined that the event is not received (NO in step S1201), the job information management unit 605 repeats the processing in step S1201. Whereas if it is determined that the event is received (YES in step S1201), the job information management unit 605 advances the processing to step S1202.

In step S1202, the job information management unit 605 obtains color ratio information (information in the color information list 810) of a page which is not yet obtained in the target job from the printer A via the data transmission reception unit 604.

Next, in step S1203, the job information management unit 605 instructs the printer A via the data transmission reception unit 604 to set the ReadFlag 817 of the page of which color ratio information is obtained in step S1202 to "ON". The color determination unit 625 in the printer A rewrites a value of the ReadFlag 817 of the target page in the color information list 810 in the color information storage unit 627 to "ON" in response to the above-described instruction.

Next, in step S1204, the job information management unit 605 updates the job information list 720 in the job information storage unit 607 with the information obtained in step S1202. More specifically, the page 732 and the color ratio 733 in the job information list 720 are updated. When the processing in step S1204 is finished, the job information management unit 605 advances the processing to step S1201.

As described above, according to the present exemplary embodiment, when the merging processing fails, the printers 104 and 105 notify the computers 101, 102, and 103 of an event indicating an obtainment request for color ratio information. Then, the computers 101, 102, and 103 obtains the color ratio information from the printers 104 and 105 in response to the event. Accordingly, a possibility of overwriting color ratio information in the printers 104 and 105 due to a delay in information obtainment processing from the computers 101, 102, and 103 can be reduced.

As described above, according to the present exemplary embodiment, a plurality of computers can obtain log information and information about a ratio of a color area in each page (a color usage ratio) of the same job with no overlap therebetween and no omission by a minimum communication with a printing apparatus even in an environment in which the plurality of computers accesses to the printing apparatus. Accordingly, log information and information about a ratio of a color area in each page of a job can be efficiently and certainly stored in the computer.

The configurations and contents of the above-described various data pieces are not limited to those ones. It goes without saying that data can include various configurations and contents according to applications and purposes of the data.

While the present disclosure has been described with reference to exemplary embodiments, it is to be understood that an exemplary embodiment of the present disclosure can be implemented as, for example, a system, an apparatus, a method, a program, and a storage medium. More specifically, the present disclosure can be applied to a system including a plurality of devices or an apparatus including a single device.

Further, configurations of combinations of the above-described exemplary embodiments are all included in the scope of the present disclosure.

OTHER EMBODIMENTS

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiments of the present disclosure, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-250010, filed Dec. 3, 2013, which is hereby incorporated by reference wherein in its entirety.

What is claimed is:

1. A system comprising a printing apparatus and an information processing apparatus,
wherein the printing apparatus comprises:
a first management unit configured to manage log information in which a history of a processing result of each job is recorded; and
a second management unit configured to manage a color information list in which information pieces about a ratio of a color area in each page of a job are stored up to a predetermined upper limit, and
the information processing apparatus comprises:
an obtaining unit configured to obtain information about a ratio of a color area in each page of a job input by the information processing apparatus itself to the printing apparatus, from the printing apparatus before the information is overwritten in the color information list; and
a storage unit configured to store information obtained by the obtaining unit together with job identification information,
wherein, in a case where information which is not recorded by another information processing apparatus is included in the color information list of the printing apparatus regarding a copy job or a facsimile (FAX) job, the obtaining unit obtains information about a ratio of a color area in each page of the copy job of the FAX job from the printing apparatus.

2. The system according to claim 1,
wherein the second management unit manages a flag indicating whether the information about a ratio of a color area in each page included in the color information list is obtained from the information processing apparatus for each page and updates the information about a ratio of a color area in each page included in the color information list according to a content of the flag, and the obtaining unit instructs the printing apparatus to update the flag with respect to a page of which information about a ratio of a color area is obtained.

3. The system according to claim 1, wherein, in the case where a number of records of information about a ratio of a color area in each page recorded in the color information list reaches the predetermined upper limit, the second management unit executes merging processing for unifying a plurality of records into one record.

4. The system according to claim 1,
wherein the printing apparatus further comprises a request unit configured to, in a case where a number of records of information about a ratio of a color area in each page recorded in the color information list reaches the predetermined upper limit, notify the information processing apparatus of a request for obtaining the information about a ratio of a color area in each page included in the color information list,
in a case where the request unit makes the request, the second management unit updates the color information list after the information processing apparatus obtains the information about a ratio of a color area in each page, and
the obtaining unit obtains the information about a ratio of a color area in each page from the printing apparatus in responses to the request.

5. The system according to claim 1,
wherein the printing apparatus further comprises a transmission unit configured to, in a case where a number of records of information about a ratio of a color area in each page recorded in the color information list reaches the predetermined upper limit, cause the second management unit to transmit output data or information about a ratio of a color area of a page to be recorded in the color information list to the information processing apparatus, and
the second management unit does not update the color information list with respect to a page of which output data or information about a ratio of a color area is transmitted by the transmission unit to the information processing apparatus.

6. A method for controlling a system comprising a printing apparatus and an information processing apparatus, the method comprising:
storing, in the printing apparatus, log information in which a history of a processing result of each job is recorded to a first management unit;
storing, in the printing apparatus, a color information list to a second management unit, wherein, in the color information list, information pieces about a ratio of a color area in each page of a job are stored up to a predetermined upper limit;
obtaining, in the information processing apparatus, information about a ratio of a color area in each page of a job sent by the information processing apparatus itself to the printing apparatus, from the printing apparatus before the information is overwritten in the color information list;
storing, in the information processing apparatus, the obtained information together with job identification information in a storage unit, and
in a case where information which is not obtained by another information processing apparatus is included in the color information list of the printing apparatus regarding a copy job or a facsimile (FAX) job, obtaining, in the information processing apparatus, the information about a ratio of a color area in each page of the copy job of the FAX job from the printing apparatus.

7. An information processing apparatus capable of communicating with a printing apparatus which comprises a first management unit configured to manage log information in which a history of a processing result of each job is recorded and a second management unit configured to manage a color information list in which information pieces about a ratio of a color area in each page of a job are stored up to a predetermined upper limit, the information processing apparatus comprising:
an obtaining unit configured to obtain information about a ratio of a color area in each page of a job input by the information processing apparatus itself to the printing apparatus, from the printing apparatus before the information is overwritten in the color information list; and
a storage unit configured to store information obtained by the obtaining unit together with job identification information,
wherein, in a case where information which is not recorded by another information processing apparatus is included in the color information list of the printing apparatus regarding a copy job or a facsimile (FAX) job, the obtaining unit obtains information about a ratio of a color area in each page of the copy job of the FAX job from the printing apparatus.

8. The information processing apparatus according to claim 7,
wherein the second management unit manages a flag indicating whether the information about a ratio of a color area in each page included in the color information list is obtained from the information processing apparatus for each page and updates the information about a ratio of a color area in each page included in the color information list according to a content of the flag, and
the obtaining unit instructs the printing apparatus to update the flag with respect to a page of which information about a ratio of a color area is obtained.

9. The information processing apparatus according to claim 7, wherein the obtaining unit obtains information about a ratio of a color area in each page from the printing apparatus in response to a request transmitted from the printing apparatus in a case where a number of records of the information about a ratio of a color area in each page recorded in the color information list reaches the predetermined upper limit in the printing apparatus.

10. A method for controlling an information processing apparatus capable of communicating with a printing apparatus which comprises a first management unit configured to manage log information in which a history of a processing result of each job is recorded and a second management unit configured to manage a color information list in which information pieces about a ratio of a color area in each page of a job are stored up to a predetermined upper limit, the method comprising:
obtaining information about a ratio of a color area in each page of a job input by the information processing apparatus itself to the printing apparatus, from the printing apparatus before the information is overwritten in the color information list;
storing obtained information together with job identification information in a storage unit; and
in a case where information which is not recorded by another information processing apparatus is included in the color information list of the printing apparatus regarding a copy job or a facsimile (FAX) job, obtaining information about a ratio of a color area in each page of the copy job of the FAX job from the printing apparatus.

11. A non-transitory computer readable storage medium on which is stored a computer program for making a computer execute a method for an information processing apparatus capable of communicating with a printing apparatus which comprises a first management unit configured to manage log information in which a history of a processing result of each job is recorded and a second management unit configured to manage a color information list in which information pieces about a ratio of a color area in each page of a job are stored up to a predetermined upper limit, the method comprising:

- obtaining information about a ratio of a color area in each page of a job input by the information processing apparatus itself to the printing apparatus, from the printing apparatus before the information is overwritten in the color information list;
- storing obtained information together with job identification information in a storage unit; and
- in a case where information which is not recorded by another information processing apparatus is included in the color information list of the printing apparatus regarding a copy job or a facsimile (FAX) job, obtaining information about a ratio of a color area in each page of the copy job of the FAX job from the printing apparatus.

* * * * *